United States Patent [19]

Johnson et al.

[11] 3,917,036

[45] Nov. 4, 1975

[54] MOLDED CAGE FOR AN OVERRUNNING ROLLER CLUTCH

[75] Inventors: Lawrence P. Johnson, Huron; Oscar G. Kitchin, Port Clinton, both of Ohio

[73] Assignee: General Motors Corporation, Detroit, Mich.

[22] Filed: Dec. 26, 1973

[21] Appl. No.: 427,903

[52] U.S. Cl. .............................. 192/45; 188/82.84
[51] Int. Cl.² .................... F16D 15/00; F16D 63/00
[58] Field of Search .............. 192/45; 308/201, 217; 29/148.4 R; 188/82.84

[56] References Cited
UNITED STATES PATENTS

| | | | |
|---|---|---|---|
| 2,946,633 | 7/1960 | Gothberg | 308/217 |
| 3,057,667 | 10/1962 | Gothberg et al. | 308/217 |
| 3,095,954 | 7/1963 | Ferris | 192/45 |
| 3,141,711 | 7/1964 | Biedinger | 308/201 |
| 3,260,333 | 7/1966 | Benson et al. | 192/45 |
| 3,388,952 | 6/1968 | Schaeffler | 308/217 |
| 3,500,977 | 3/1970 | Gehrke | 192/45 |
| 3,582,165 | 6/1971 | Koch | 308/217 |
| 3,760,914 | 9/1973 | Gelbrich | 192/45 |

*Primary Examiner*—Samuel Scott
*Assistant Examiner*—Lance W. Chandler
*Attorney, Agent, or Firm*—F. J. Fodale

[57] ABSTRACT

A unitary molded annular cage for a roller clutch is configured to be molded in a two-part mold which does not require any separate mold inserts. The cage, clutch rollers and individual biasing springs for each of the clutch rollers form a unit-handled subassembly. The cage is provided with radially projecting ears which permit assembly of the subassembly to a cammed clutch race by axial and indexing movements. After assembly, the ears retain the cammed clutch race axially and transfer the reaction of the biasing springs to the cammed clutch race.

4 Claims, 12 Drawing Figures

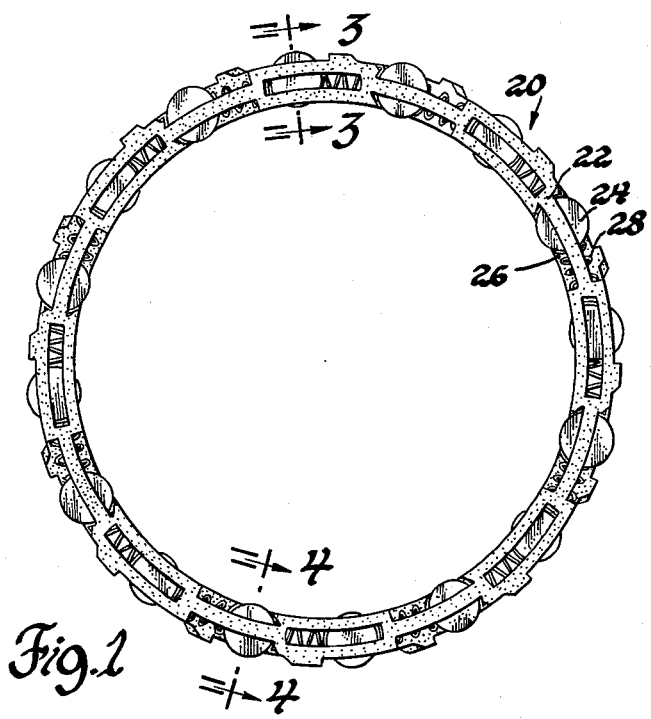
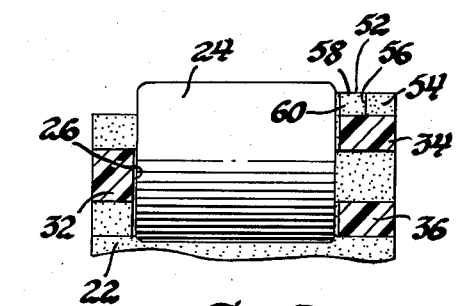
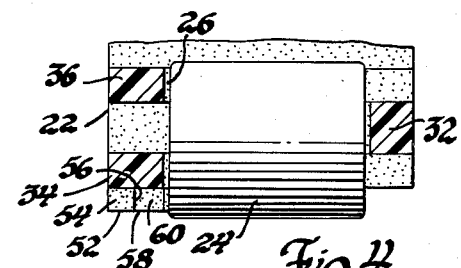
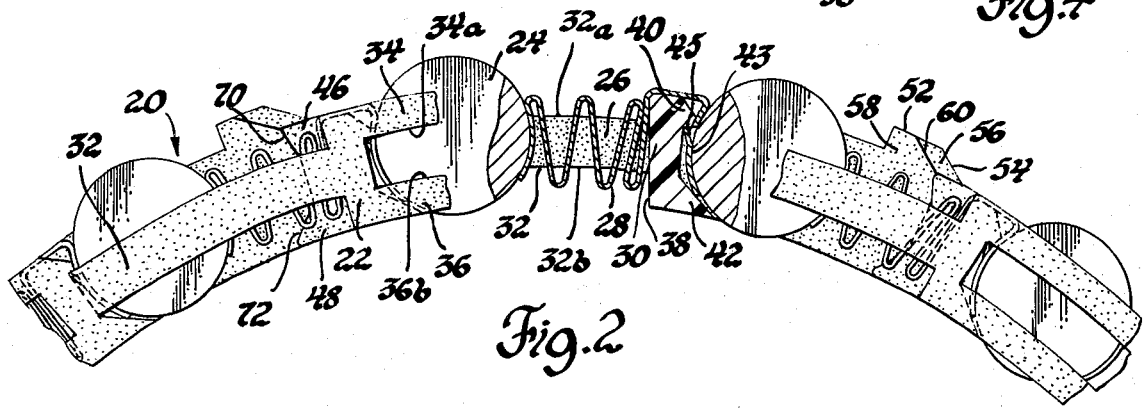
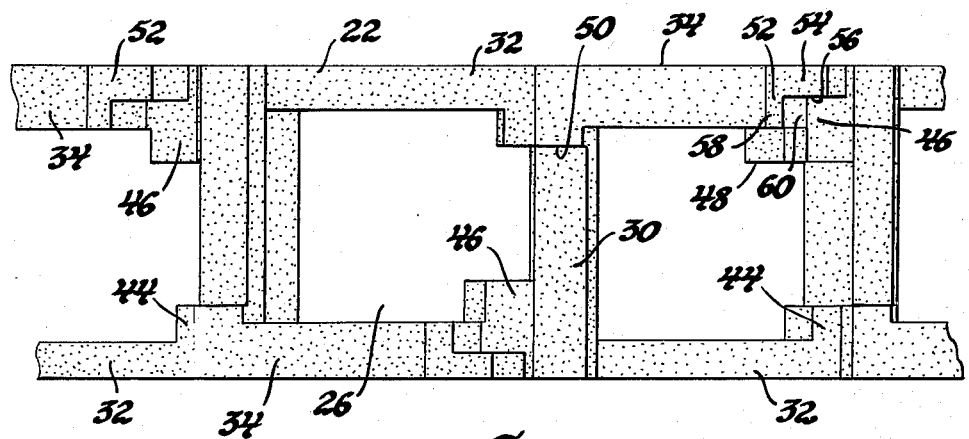

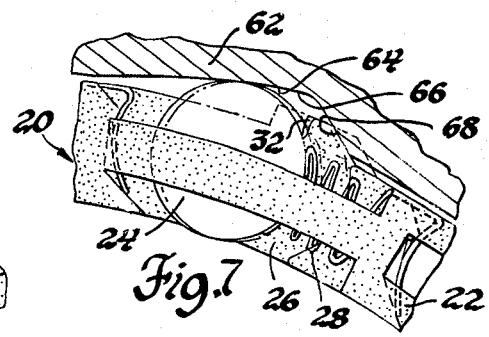
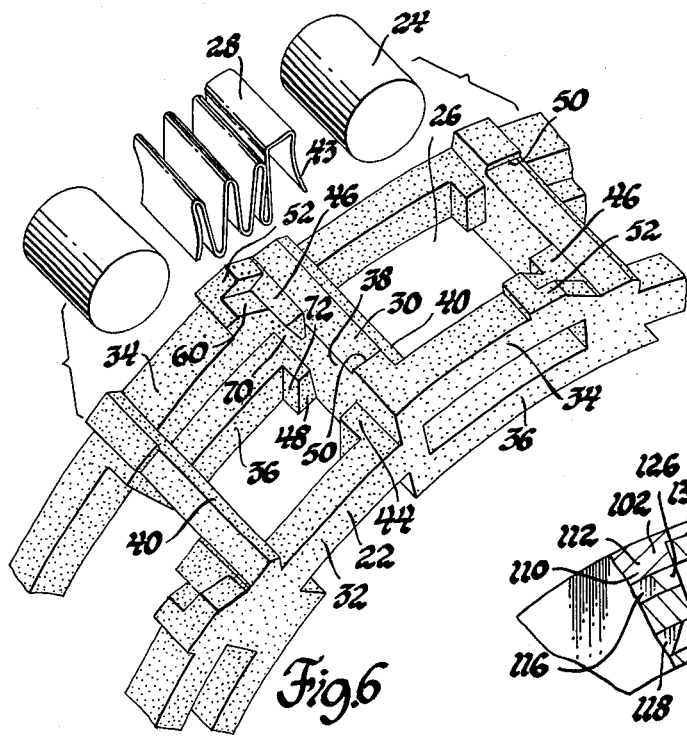
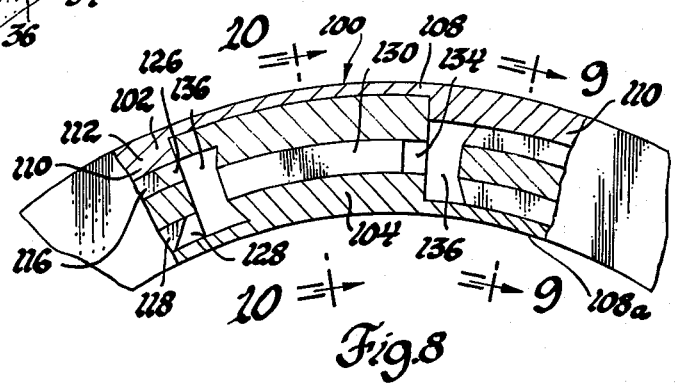
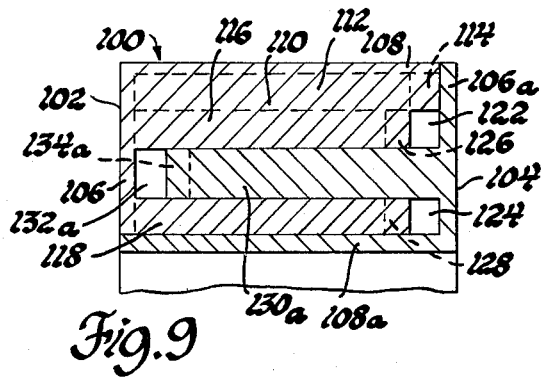
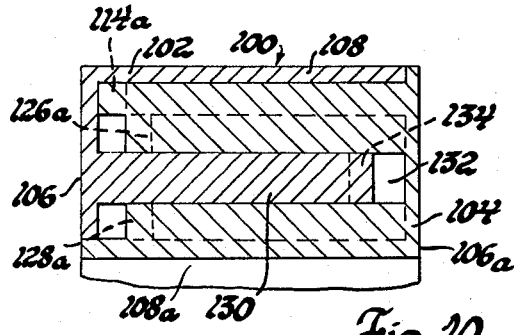
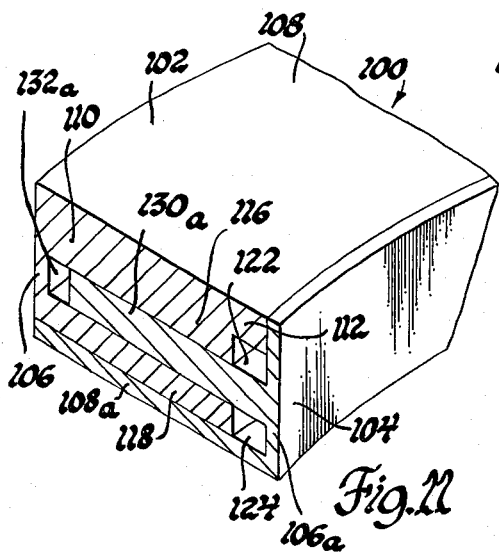
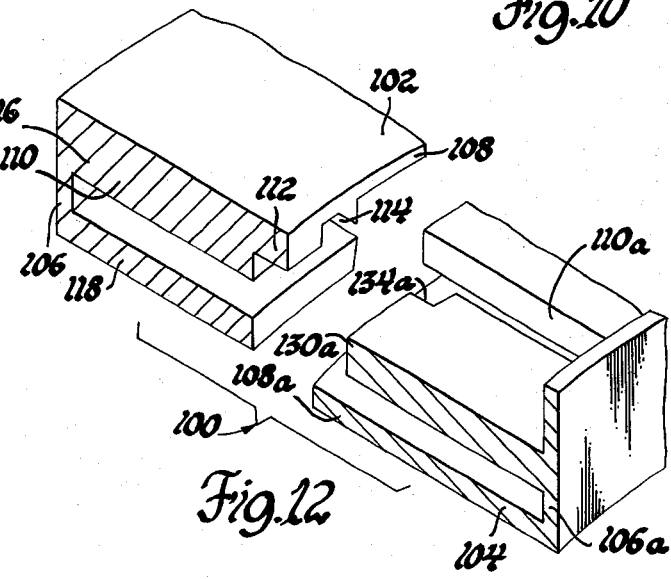

MOLDED CAGE FOR AN OVERRUNNING ROLLER CLUTCH

Our invention relates generally to roller clutches and more particularly to a cage for a roller clutch.

One general type of roller clutch comprises a cylindrical clutch race, a cammed clutch race, and a plurality of rollers disposed in the pockets of a cage and biased toward incipient wedging engagement between the races by individual springs carried by the cage. The cage, rollers and spring usually are a subassembly.

In the past, roller clutch cages have been machined from metal stock, built from one or more sheet metal stampings, or molded from various moldable materials usually of the type generally referred to as a plastic. Cages are also used in antifriction bearings. Bearing cages likewise have been made in a variety of ways including molding.

While cages for antifriction bearings are in some respects similar to cages for roller clutches, they are different in other respects. For instance, bearing cages do not carry springs nor transfer the spring reaction to a race as roller clutch cages do. The U.S. Pat. to Biedinger No. 3,141,711 shows a bearing cage which can be molded in a two-part mold which mold does not require removable inserts to form the roller pockets. The Biedinger cage, however, is unsuitable as a roller clutch cage as it has not provision for carrying springs or transferring the reaction of the springs to a race. We are also aware that roller clutch cages have been molded in the past, however, as far as we are aware, none of the known molded cages are capable of being molded in a two-part mold without separate mold inserts.

In its broadest aspect, the object of our invention is to provide a roller clutch cage which may be molded in a two-part mold which mold does not require separate inserts to form the cage pockets or any other cavities in the cage.

Another object of oour invention is to provide such a cage which includes means for mounting springs and for transferring the reaction of the springs to a cammed clutch race.

An object of our invention in a narrower sense is to provide a roller clutch cage moldable in a two-part mold without separate mold inserts which cage includes means for carrying springs for individually engaging rollers disposed in pockets of the cage and means for transferring the reaction of the springs to a cammed clutch race in a substantially balanced manner.

Another object of our invention in a narrower sense is to provide a roller clutch cage moldable in a two-part mold without separate mold inserts which cage is able to transfer the reaction of springs carried thereby to a cammed clutch race and retain the cammed clutch race axially.

Yet another object of our invention is a narrower sense is to provide a roller clutch cage moldable in a two-part mold without separate mold inserts which cage is capable of retaining springs and rollers in a subassembly which subassembly may be assembled to a cammed clutch race by axial and indexing movements and thereafter retain the cammed clutch axially.

Other objects and features of our invention will become apparent to those skilled in the art as the disclosure is made in the following detailed description of a preferred embodiment of our invention as illustrated in the accompanying sheets of drawings in which:

FIG. 1 is an axial end view of a roller clutch subassembly having a molded cage in accordance with our invention.

FIG. 2 is an enlargement of a portion of FIG. 1 partially broken away and showing the operative association of the various parts of the roller clutch subassembly prior to assembly with a cammed clutch race.

FIG. 3 is an enlarged section taken along the line 3—3 of FIG. 1.

FIG. 4. is an enlarged section taken along the line 4—4 of FIG. 1.

FIG. 5 is a top view of the molded cage shown in FIGS. 1, 2, 3 and 4.

FIG. 6 is an exploded perspective view of a portion of the subassembly shown in FIG. 1.

FIG. 7 is a fragmentary, partially sectioned view of the subassembly shown in FIG. 1 showing two operative positions of the subassembly in conjunction with a cammed outer race.

FIG. 8 is a partial axial end view, partially broken away of a two-part mold without separate mold inserts for molding the cage shown in FIG. 1.

FIGS. 9 and 10 are sections taken along the lines 9—9 and 10—10 respectively of FIG. 8.

FIG. 11 is a perspective view of a portion of the mold shown in FIG. 8 showing the mold in the closed position.

FIG. 12 is a perspective view of a portion of the mold shown in FIG. 8 showing the mold in the open position.

Referring now to the drawings, FIG. 1 shows a roller clutch subassembly 20 comprising a cage 22 of a unitary molded construction, a plurality of rollers 24 disposed within pockets 26 of the cage, and a plurality of springs 28 carried by the cage which engage the rollers 24 and bias them against one end of the pockets 26.

As seen in FIGS. 2, 5 and 6, the cage 22 comprises a plurality of circumferentially spaced cross bars 30 connected to each other by arcuate end segments 32, 34 and 36. The arcuate end segments 32, 34 and 36 have specific dimensional relationships in order to make it possible to mold the cage 22 in a two-part mold without separate mold inserts.

More specifically, the diameter of the outer surface 32a of the arcuate end segment 32 is no greater than the diameter of the inner surface 34a of the arcuate end segment 34, and the diameter of the inner surface 32b of the arcuate end segment 32 is no less than the diameter of the outer surface 36b of the arcuate end segment 36. See FIG. 2. This dimensional relationship allows the pockets 26 to be formed by interleaving mold fingers of a two-part mold as will hereinafter be more fully explained. Preferably, the diameters of the surfaces 32a and 34a are substantially equal and the diameter of the surfaces 32b and 36b are substantially equal for maximum strength of the arcuate end segments 32.

The arcuate end segments 32 connect adjacent cross bars 30 alternatively at one end and then at the other end. See particularly FIG. 5. The arcuate end segments 34 and 36 are arranged in radially spaced, coplanar pairs. The pairs of end segments 34 and 36 connect adjacent cross bars 30 alternately at one end and then at the other end with a pattern circumferentially indexed one pocket so that when two adjacent cross bars are connected at one end by an arcuate end segment 32, the same two adjacent cross bars are connected at the other end by a pair of arcuate end segments 34 and 36.

Thus each side of the cage has a number of each of the different end segments 32, 34 and 36 and each pocket 26 is in a sense reversed from the pocket on either side of it. This pattern of alternating the end segments from side-to-side permits the molding of ears integral with the cage on both sides of the cage which is an important feature as will be hereinafter explained more fully.

The cross bars 30 have a flat radial face 38 on one side and a concave-like radial face on the other side formed by an outer ledge 40 and an inner ledge 42. The outer ledges 40 and the inner ledges 42 are radially aligned with the arcuate end segments 34 and 36 respectively and extend respectively therefrom to the opposite end of the cross bar which is connected at its concave-like side by a segment 32 to an adjacent cross bar.

Each of the springs 28 is an accordion-shaped steel ribbon having an integral U-shaped clip 43 at one end which is snapped over the outer portion of a cross bar 30 and retained thereon by a spring finger 45 which enages the underside of the outer ledge 40. When so mounted the free ends of the springs 28 (curved to conform to the rollers 24) retain the rollers 24 within the pockets 26 by holding them against the concave end of the clip of the spring on the next cross bar.

The springs 28 may be retained axially on the cross bars 30 by three corner blocks 44, 46 and 48 formed at the juncture of the flat radial face 38 with the arcuate end segments 32, 34 and 36 respectively. The corner blocks 46 which hold the springs 28 in one axial direction have the same radial thickness as the arcuate end segments 32 to facilitate their formation in a two-part mold without separate mold inserts. For the same reason, the confronting surfaces of the corner blocks 46 and 48 are spaced the same distance apart as the arcuate end segments 34 and 36.

The top surfaces of the cross bars 30 may be partially relieved to provide a radial shoulder 50 on each cross bar which is coplanar with the end faces of the corner block 44 associated with that particular cross bar to aid the corner block 44 in retaining the springs 28 in one axial direction. The relief also permits a more generous spacing of the spring clips 43 from the cammed race when the subassembly containing the cage 22 is assembled with it.

Each of the arcuate end segments 34 have a radially projecting ear 52 at the circumferential end portions joined with the flat faces 38 of the cross bars 30 by the corner blocks 46. Each of the ears 52 have outboard lug portions 54 which provide radial race retaining surfaces 56 facing inboard and inboard portions 58 having a generally radial sloping reaction surface 60 for transferring the spring reaction to a cammed clutch race. As mentioned previously, adjacent cross bars are connected by the arcuate end segments 34 alternately at one end and then at the other, and consequently each side of the cage has a number of the segments 34 equal to half the number of roller pockets 26.

In reference now to FIG. 7, the manner in which the subassembly 20 is assembled to a cammed outer race 62 having a number of recesses 64 which include cam surfaces 66 and reaction surfaces 68 corresponding to the number of rollers 24 will now be explained. the configuration of the ears 52 is such that the ears 52 are axially receivable in the enlarged ends of the recesses 64. By means of a suitable tool (not shown) the rollers 24 are moved from the position shown in FIG. 2 where the rollers 24 engage the curved ends of the spring clips 43 to a position where the rollers 24 engage the corner blocks 44, 46 and 48 such as is shown in phantom lines in FIG. 7. It should be noted that the corner blocks 46 and 48 preferably have slanted radial faces 70 and 72 respectively which aid in preventing the rollers from dropping out of assembly with the cage 22 and further that the blocks protect the springs against total collapse by the rollers. With the rollers held in this position, the subassembly 20 is slid axially into the cammed outer race 62, the ears 52 on the entering side of the cage 22 being axially receivable into the recesses 64 without the rollers 24 interferring with the cam surfaces 66. The subassembly 20 is slid axially into the cammed clutch race 62 until those ears 52 which entered one side of the race emerge from the other side and the assembly 20 is in an axially centered position. Thereupon the rollers 24 are released and under the action of the springs 28, the cage 22 is indexed circumferentially in the clockwise direction as shown in FIG. 7 to the solid line position shown therein. In this assembled position, the spring reaction faces 60 of the ears 52 engage the reaction surfaces 68 of the race 62 and the retaining surfaces 56 overlie the axial end portions of the cammed race 62 which are adjacent the reaction surfaces 68. The rollers 24 are also moved into engagement with the cams 66 under the action of the springs 28. Since half of the ears are disposed on each side of the cammed outer race 62, the spring reaction forces are transferred to the race in a balanced manner and the race 62 is retained in assembly with the subassembly 20.

While the cage 22 is illustrated as having ears associated with each pocket, in some instances a lesser number of ears may be adequate and a lesser number may be used while still retaining the balanced reaction and retention features of our invention. Furthermore, the cage 22 may obviously be modified for use with a cammed inner race. It has been disclosed in connection with a cammed outer race as this is the more prevelant situation.

A two-part mold for molding the cage 22 without any separate mold inserts is shown in FIGS. 8–12. Basically, each mold part comprises a radial wall, a circumferential wall at one margin of the radial wall and three sets of circumferentially spaced fingers located on three distinct radial levels. The outer and inner sets of fingers are radially aligned and alternate with an intermediate set of fingers in the circumferential direction. In the closed position of the mold, the respective sets of fingers of each mold half are in an interdigitated relationship.

More specifically, the two-part mold 100 consists of generally annular mold parts 102 and 104. The mold part 102 comprises a radial wall 106 and an outer cylindrical wall 108. An outer set of circumferential spaced fingers 110 are attached to the radial wall 106 and the outer cylindrical wall 108. The outer portion 112 of the fingers 110 are spaced apart a distance equal to their circumferential width so that upon receipt of like fingers of the mold part 104 between them registers the mold parts. The axial ends of the outer portions 112 have cavities 114 (FIG. 12) for forming the ears 52 on one side of the cage 22. An inner set of fingers 118 project from the radial wall 106 in a radially spaced and aligned relationship with the outer fingers 110. The inner portions 116 of the fingers 110 and the inner fingers 118 are shorter in the axial direction than the outer portions 112 so that when the mold is closed, cavities 122 and 124 (FIG. 9) are provided for molding the arcuate end segments 34 and 36 respectively on the one side of the bearing. The inner portions 116 have trapezoidal shaped cavities 126 in their axial ends for forming the corner blocks 46 and correspondingly the inner fingers 118 have trapezoidal cavities 128 in their axial ends for forming the corner blocks 48 on the one side of the cage 22.

The intermediate fingers 130 have the same axial length as the inner fingers 118 and the inner portions 116 of the outer fingers 110 so that when the mold is closed, cavities 132 are provided for molding the segments 32 on the one side of the cage 22. A square-shaped notch 134 in the end of each of the intermediate fingers 130 provides the cavity for molding the corner blocks 44 associated with these particular segments.

The inner portions 116 of the outer fingers 110, the intermediate fingers 130, and the inner fingers 118 are all shorter in the circumferential direction than the outer portions 112 of the outer fingers 110. The finger pattern on the mold part 104 is the mirror image of the finger pattern on the mold part 102. Thus when the mold parts 102 and 104 are closed, channels 136 extending from end-to-end are formed for molding the cross bars 30 and cavities are formed for molding the segments, ears and corner blocks at the opposite end of the cage 22 in a pattern indexed circumferentially by one roller pocket.

The elements of mold part 104 corresponding to the elements of mold part 102 are identified with corresponding numerals and the letter designation *a*. As mentioned previously, the fingers are identical but in a mirror image pattern. The only other difference is that the cylindrical wall 108*a* is at the inner margin of the radial wall 106*a* and connected to the inner fingers 118*a* for a complete enclosure of the fingers when the mold parts are in the closed position.

We wish it to be understood that we do not desire to be limited to the exact details of construction shown and described, for obvious modifications will occur to a person skilled in the art.

What is claimed is:

1. A roller clutch cage comprising
   a plurality of generally axial, circumferentially spaced cross bars having first and second axial end portions,
   a plurality of first arcuate end segments alternately connecting said first and second axial end portions of adjacent cross bars,
   a plurality of second arcuate end segments alternately connecting said first and second axial end portions of adjacent cross bars,
   said second arcuate end segments having an outer diameter no greater than the inner diameter of said first arcuate end segments,
   said first and second arcuate end segments being connected to opposite axial end portions of adjacent cross bars and forming generally rectangular roller receiving pockets therewith,
   a plurality of first ears projecting radially from a number of arcuate end segments connecting said first axial end portions, and
   a plurality of second ears projecting radially from a number of arcuate end segments connecting said second axial end portions,
   said first and second ears being integral with the same type of arcuate end segments and projecting away from the other type of arcuate end segments and having portions spaced radially from said cross bars whereby said cage is adapted to be molded in a two-part mold without any separate mold inserts and whereby said first and second ears are adapted to engage recessed surfaces in a cammed clutch race.

2. The cage as defined in claim 1 wherein said first ears are integral with a number of said first arcuate end segments connecting said first axial end portions, said second ears are integral with a like number of said first arcuate end segments connecting said second axial end portions and said first and second ears project radially outwardly from their respective arcuate end segments and have portions disposed radially outwardly of said cross bars.

3. A roller clutch cage comprising
   a plurality of generally axial, circumferentially spaced cross bars having first and second axial end portions,
   a plurality of outer and inner arcuate end segments arranged in coplanar pairs alternately connecting said first and second axial end portions of adjacent cross bars,
   a plurality of intermediate arcuate end segments alternately connecting said first and second axial end portions of adjacent cross bars,
   said intermediate arcuate end segments having an outer diameter substantially equal to the inner diameter of said outer arcuate end segments and an inner diameter substantially equal to the outer diameter of said inner arcuate end segments and said coplanar pairs and said intermediate arcuate end segments being connected to opposite axial end portions of adjacent cross bars to facilitate the forming of generally rectangular roller receiving pockets in a two-part mold without separate mold inserts,
   a plurality of first, radially outwardly projecting ears integral with a number of said outer arcuate end segments connecting said first axial end portions,
   a plurality of second, radially outwardly projecting ears integral with a like number of said outer arcuate end segments connecting said second axial end portions,
   each of said first and second ears being located adjacent a cross bar and having an outboard and an inboard portion disposed radially outwardly of the cross bar,
   said outboard portions having a radial surface perpendicular to the axis of the cage and facing inboard for engaging an end surface of a cammed clutch race,
   said inboard portions having a generally axial surface perpendicular to the radial surfaces of the outboard portions and sloping radially inwardly toward the adjacent cross bar for engaging a recessed surface in a cammed clutch race, whereby said cage is adapted to axially retain a cammed clutch race and impart a balanced reaction force thereto,
   outer, inner and intermediate corner blocks respectively connected to said outer, inner and intermediate arcuate end segments and said cross bars whereby the cage is adapted to axially retain accordion-shaped springs when such are mounted on said cross bars and protect the springs against total collapse by rollers when such are disposed in said pockets, said outer, inner and intermediate corner blocks respectively being aligned with said outer, inner and intermediate arcuate end segments and each of said corner blocks having no greater radial thickness than the arcuate end segment with which it is aligned to facilitate the molding thereof in a two-part mold without separate mold inserts, and each of said cross bars having an outer ledge aligned with said outer arcuate end segments and having no greater radial thickness than the outer arcuate end segment with which it is aligned for retaining a spring thereon and facilitating the molding of the ledges in a two-part mold without mold inserts.

4. The roller clutch cage as defined in claim 3 wherein each of said cross bars has an inner ledge aligned with said inner arcuate end segments which inner ledge has a radial thickness no greater than that of the inner arcuate end segment with which it is aligned to facilitate the molding thereof in a two-part mold without separate mold inserts and wherein said outer and inner ledges are located on the sides of the cross bars opposite the sides connected to the corner blocks whereby said outer and inner ledges are adapted to cooperate in retaining rollers in a unit-handled subassembly with said cage.

* * * * *